(12) United States Patent
Wissemborski et al.

(10) Patent No.: US 11,536,880 B2
(45) Date of Patent: Dec. 27, 2022

(54) USE OF CRYSTAL WATER-FREE FE(II) COMPOUNDS AS RADIATION ABSORBERS

(71) Applicant: Chemische Fabrik Budenheim KG, Budenheim (DE)

(72) Inventors: Rüdiger Wissemborski, Gau-Algesheim (DE); Christian Litterscheid, Ober-Olm (DE); Rainer Schnee, Mainz (DE); Franziska Welsch-Papenbreer, Waldalgesheim (DE); Joachim Adolf, Mainz (DE)

(73) Assignee: Chemische Fabrik Budenheim KG, Budenheim (DE)

( * ) Notice: Subject to any disclaimer, the term of this patent is extended or adjusted under 35 U.S.C. 154(b) by 498 days.

(21) Appl. No.: 16/498,481

(22) PCT Filed: Mar. 26, 2018

(86) PCT No.: PCT/EP2018/057659
§ 371 (c)(1),
(2) Date: Sep. 27, 2019

(87) PCT Pub. No.: WO2018/178020
PCT Pub. Date: Oct. 4, 2018

(65) Prior Publication Data
US 2020/0103565 A1    Apr. 2, 2020

(30) Foreign Application Priority Data

Mar. 30, 2017   (DE) .................... 10 2017 106 911.9

(51) Int. Cl.
*G02B 5/00*      (2006.01)
*C08K 3/32*      (2006.01)
*G02B 1/04*      (2006.01)

(52) U.S. Cl.
CPC ............... *G02B 5/003* (2013.01); *C08K 3/32* (2013.01); *G02B 1/04* (2013.01); *C08K 2003/328* (2013.01)

(58) Field of Classification Search
CPC ...................................................... G02B 5/003
See application file for complete search history.

(56) References Cited

U.S. PATENT DOCUMENTS 5,063,011 A * 11/1991 Rutz ................... C22C 33/0228
                                                                      264/126
5,489,639 A    2/1996 Faber et al.
(Continued)

FOREIGN PATENT DOCUMENTS

CN    1886450 A      12/2006
CN    101316906 A    12/2008
(Continued)

OTHER PUBLICATIONS

Lyakhov N.Z. "Polucheniye metallicheskikh nanoporoshkov vosstanovlenjiyem v organicheskikh zhidkostyakh", Khimia v interesakh ustojchivogo razvitia, 22, 2014, pp. 409-416.
(Continued)

*Primary Examiner* — Michael F Pepitone
(74) *Attorney, Agent, or Firm* — Faegre Drinker Biddle & Reath LLP

(57) ABSTRACT

A method of using an absorber of electromagnetic radiation, includes absorbing electromagnetic radiation with the absorber finely distributed or dissolved in a carrier material. The absorber is a crystal water-free iron(II) orthophosphate of the general formula $Fe_3(PO_4)_2$ or crystal water-free iron (II) metal orthophosphate, iron(II) metal phosphonate, iron (II) metal pyrophosphate or iron(II) metal metaphosphate of the general formula $Fe_aMet_b(PO_c)_d$, where a is a number from 1 to 5, b is a number from >0 to 5, c is a number from 2.5 to 5, d is a number from 0.5 to 3 and Met represents one
(Continued)

or more metals selected from the group consisting of Li, Na, K, Rb, Cs, Mg, Ca, Sr, Ba, the transition metals (d block), the metals and semimetals of the third, fourth and fifth main groups, and the lanthanoids or combinations of the above mentioned phosphates as absorbers of electromagnetic radiation.

11 Claims, 4 Drawing Sheets

(56) References Cited

U.S. PATENT DOCUMENTS

| | | | |
|---|---|---|---|
| 10,793,437 | B2 | 10/2020 | Adolf et al. |
| 10,837,114 | B2 * | 11/2020 | Kim .................... C23C 18/1614 |
| 2002/0039552 | A1 * | 4/2002 | Sapieszko ................ A61K 6/69 |
| | | | 423/311 |
| 2002/0140137 | A1 | 10/2002 | Sapieszko et al. |
| 2007/0155881 | A1 | 7/2007 | Hirthe et al. |
| 2008/0241492 | A1 | 10/2008 | Demartin Maeder et al. |
| 2009/0292051 | A1 | 11/2009 | Li et al. |
| 2010/0069650 | A1 | 3/2010 | Hibst et al. |
| 2010/0105926 | A1 | 4/2010 | Hibst et al. |
| 2010/0105927 | A1 | 4/2010 | Hibst et al. |
| 2010/0140571 | A1 | 6/2010 | Scheuer et al. |
| 2012/0010345 | A1 | 1/2012 | Edler et al. |
| 2012/0058039 | A1 | 3/2012 | Huang |
| 2013/0065979 | A1 | 3/2013 | Kümmet et al. |
| 2013/0168133 | A1 | 7/2013 | Schrauwen |
| 2013/0214460 | A1 | 8/2013 | Rogers et al. |
| 2014/0248564 | A1 * | 9/2014 | Schrauwen ............ H05K 3/185 |
| | | | 430/319 |
| 2014/0360240 | A1 | 12/2014 | Wissing et al. |
| 2015/0175804 | A1 | 6/2015 | Aepli |
| 2015/0291778 | A1 | 10/2015 | Musick et al. |
| 2016/0280544 | A1 | 9/2016 | Wissemborski et al. |
| 2016/0340508 | A1 | 11/2016 | Kim et al. |
| 2017/0002193 | A1 | 1/2017 | Cheng et al. |
| 2017/0275764 | A1 | 9/2017 | Kim et al. |
| 2017/0361584 | A1 | 12/2017 | Feng et al. |
| 2020/0032028 | A1 | 1/2020 | Fünderich et al. |
| 2020/0095127 | A1 | 3/2020 | Adolf et al. |

FOREIGN PATENT DOCUMENTS

| | | |
|---|---|---|
| CN | 101501140 A1 | 8/2009 |
| CN | 101659406 B | 5/2011 |
| CN | 103167945 A | 6/2013 |
| CN | 104151923 A | 11/2014 |
| CN | 104725837 A | 6/2015 |
| CN | 105492214 A | 4/2016 |
| CN | 105793196 A | 7/2016 |
| CN | 105899592 A | 8/2016 |
| CN | 105899609 A | 8/2016 |
| DE | 39 17 294 A1 | 11/1990 |
| DE | 100 53 639 A1 | 5/2002 |
| DE | 10 2006 038 043 A1 | 2/2008 |
| DE | 10 2009 001 335 A1 | 9/2010 |
| DE | 10 2013 100 583 A1 | 7/2014 |
| EP | 0 917 597 B1 | 1/2003 |
| EP | 1 191 127 B1 | 10/2004 |
| EP | 1 274 288 B1 | 3/2005 |
| EP | 1790701 A1 | 5/2007 |
| EP | 2 079 122 A1 | 7/2009 |
| JP | 2010-521400 A | 6/2010 |
| JP | 2010-521402 A | 6/2010 |
| JP | 2010-524809 A | 7/2010 |
| JP | 2015-120908 A | 7/2015 |
| JP | 2017-48377 A | 3/2017 |
| JP | 2017-508009 A | 3/2017 |
| KR | 10-2016-0047931 A | 5/2016 |
| WO | WO-98/31630 A1 | 7/1998 |
| WO | WO-2005/052049 A1 | 6/2005 |
| WO | WO-2010/076265 A2 | 7/2010 |
| WO | WO-2012/055742 A2 | 5/2012 |
| WO | WO-2014/111403 A1 | 7/2014 |
| WO | WO 2014/203227 A2 | 12/2014 |
| WO | WO-2015/067545 A1 | 5/2015 |
| WO | WO-2016/064192 A1 | 4/2016 |
| WO | WO-2016064192 A1 * | 4/2016 ........... H01B 13/348 |
| WO | WO-2016/189023 A1 | 12/2016 |
| WO | WO-2018/178022 A1 | 10/2018 |

OTHER PUBLICATIONS

Office Action dated Jun. 5, 2020 for Eurasian patent application No. 201992301.
Office Action dated Mar. 23, 2020 for JP 2019-553906.
Office Action dated Jul. 7, 2021 for Taiwanese patent application No. 107109229.
Office Action dated Aug. 4, 2021 for Chinese patent application No. 201880023260.7.
Chaiyasith, Pachernchaipa, et al., "A Simple Route to Synthesize Ferromagnetic Binary Calcium Iron Pyrophosphate $CaFeP_2O_7$ Using Aqueous-Acetone Media," Advanced Materials Research, vol. 717, 2013, pp. 44-48.
German Search Report dated Aug. 31, 2017 for DE 10 2017 106 913.5.
German Search Report dated Nov. 7, 2017 for DE 10 2017 106 912.7.
International Preliminary Report on Patentability dated May 3, 2019 for PCT/EP2018/057660.
Priority document for WO2018178022, DE102017106913.5, with machine translation. Printed Jan. 23, 2020. (Year: 2020).
Swider, J. et al., "A novel concept for the synthesis of nanometric LiFePo4 by co-precipitation method in an anhydrous environment," Procedia Engineering, 98 (2014), pp. 36-41.
U.S. Appl. No. 16/496,591, filed Sep. 23, 2019.
U.S. Appl. No. 16/498,645, filed Sep. 27, 2019.
Office Action dated Jan. 7, 2021 for Chinese patent application No. 201880023260.7.
Office Action dated Apr. 2, 2021 for Chinese patent application No. 201880023247.1.
Sitzia, Rita, "Infrared spectra of some natural phosphates," Rendiconti Del Seminario Della Facolta Di Scienze Dell 'Universita Di Cagliari, Bd. 36, Nr. 1-2, Jan. 1, 1966, Seiten 105-115.
German Search Report issued Aug. 30, 2017 for DE 10 2017 106 911.9.
Office Action dated Dec. 7, 2021 for Japanese patent application No. 2019-553862.
Office Action dated Dec. 22, 2021 for Chinese patent application No. 201880023260.7.
KR Office Action dated Sep. 6, 2022 for KR Application No. 10-2019-7027698.

* cited by examiner

USE OF CRYSTAL WATER-FREE FE(II) COMPOUNDS AS RADIATION ABSORBERS

CROSS REFERENCE TO RELATED APPLICATIONS

This application is a National Stage of International Application No. PCT/EP2018/057659 filed Mar. 26, 2018, which claims benefit of German Patent Application No. 10 2017 106 911.9 filed Mar. 30, 2017, both of which are herein incorporated by reference in their entirety.

The present invention relates to new uses of crystal water-free iron (II) orthophosphates of the general formula $Fe_3(PO_4)_2$ and crystal water-free iron(II) metal orthophosphate, iron(II) metal phosphonate, iron(II) metal pyrophosphate or iron (II) metal metaphosphate of the general formula $Fe_aMet_b(PO_c)_d$ or mixtures of the above.

BACKGROUND OF THE INVENTION

A large number of different organic and inorganic absorbers of radiation in the near-infrared range (NIR) of the electromagnetic range, in other words in the wavelength range of around 780 nm to 1400 nm, and possible uses of absorbers of this type are known from the literature. Despite their prevalence, the use of organic NIR absorbers is associated with a number of disadvantages. For example, the use of what are known as leuco dyes requires the addition of thermal acid generators (TAGs). On exposure to heat or lasers, these compounds release protons, inducing a change in the colour of the leuco dye. Typical TAG compounds of this type include ammonium salts from organic silicon or boron compounds or benzyl hydroxybenzoate. Furthermore, organic NIR absorbers often demonstrate absorption in the region of visible light and therefore their own colour, which is undesirable in some applications. Organic NIR absorbers are also mostly complex, synthetic compounds which are difficult to access and complex to produce, and the use of which is linked to ecological and toxicological concerns. Even the comparatively low thermal stability of the organic compounds is a disadvantage of these NIR absorbers and severely limits the scope of their use.

For many years, there have therefore been attempts to replace organic compounds with simple and stable compounds. A very simple, strong absorber which is available in a cost-effective manner is for example soot. However, the use of soot is also associated with a number of disadvantages. The greatest disadvantage of soot is without doubt its non-specific absorption over a wide range of the electromagnetic spectrum, in particular the absorption in the visible range which leads to it being black in colour but also as a result to an undesirable grey or black colour of the carrier material in which the absorber is incorporated.

The use of various inorganic metal oxides, minerals and complex compounds as NIR absorbers is a possible alternative. These generally demonstrate good temperature resistance and are also simple and cost-effective to manufacture.

WO 2012/055742 A2 relates to a stretch blow process for thermoplastic materials comprising the use of compounds which absorb IR radiation. In this method, a preform is manufactured from a polyolefin composition by means of injection moulding, which preform contains phosphates, condensed phosphates or hydroxide phosphates of copper, calcium, tin or iron as IR absorbers. The preform is then heated using IR radiation and shaped in the stretch blow process. Copper hydroxide phosphate, $Cu_2(OH)PO_4$, is mentioned as the IR absorber in the examples. The use of this absorber is intended to ensure an improvement in wall thickness distribution of the products of the method.

WO 2005/052049 relates to thermoplastic polymers which contain IR absorbers of the general formula $Me_x(PO_4)_y(OH)_z$, where Me consists of one or more elements of the group Cu, Fe, Mn, Sb, Zn, Ti, Ni, Co, V, Mg, Bi, Be, Al, Ce, Ba, Sr, Na, K, Ge, Ga, Ca, Cr, In or Sn and x=1-18, y=1-12 and z=0.2-10. The only expressly mentioned and preferred absorbers, however, are monometallic and mixed metallic copper phosphate compounds, and like WO 2012/055742 A2 the embodiments relate exclusively to copper hydroxide phosphate, $Cu_2(OH)PO_4$.

DE 39 17 294 A1 discloses laser inscribable polymers which contain an aggregate as an absorber which should not have a colour itself or should only have very limited colour in the visible range from 400 nm to 750 nm and by means of the action of a laser beam in the IR range of the spectrum above 900 nm and/or in the UV range of the spectrum below 400 nm should generate marking with a significant colour contrast. DE 39 17 294 A1 discloses molybdenum(VI) oxide ($MoO_3$) and copper hydroxide phosphate as absorbing aggregates, with the latter being particularly suitable. Titanium dioxide, titanium yellow and red iron oxide are mentioned as further aggregates, but with the aim of giving the polymer and therefore the writing on it a background colour corresponding to the colour of these substances: white, yellow or red.

Copper hydroxide phosphate is also known from many other documents in the prior art as an excellent IR radiation absorber with no significant colour of its own, which is why it has been used as a radiation absorber in many applications for many years. Examples of this are the above mentioned heating of a polymer in the stretch blow process, laser marking, but also the laser welding of thermoplastic materials and other applications in which a more or less transparent polymer absorbs IR radiation and/or UV radiation, and can achieve a higher or lower level of warming of the carrier material depending on the application. To date, almost no absorbers are known which reach the exceptional properties of copper hydroxide phosphate with regard to absorption ability with simultaneous high thermal and chemical stability and a lack of colour in the absorber itself. Copper hydroxide phosphate shows significant absorption in the wavelength range of around 800-1600 nm.

One disadvantage of copper hydroxide phosphate, which is known to be an excellent absorber, and other copper phosphate compounds lies in the comparatively high manufacturing costs. In addition to this, there is the fact that for reasons of water protection copper should ideally not get into waste water or has to be removed from the water at high cost, which is why the avoidance of copper compounds is striven for in many applications.

OBJECT

The object of the present invention therefore lies in providing absorbers for various uses which have advantages compared to the prior art and are similarly suitable or even more suitable than known absorbers in terms of the absorption of NIR radiation and at the same time have high thermal and chemical stability, no colour or limited colour of their own and do not raise toxicological or ecological concerns.

DESCRIPTION OF THE INVENTION

This object is achieved according to the invention by means of the use of crystal water-free iron(II) orthophosphate of the general formula $Fe_3(PO_4)_2$ or crystal water-free iron(II) metal orthophosphate, iron(II) metal phosphonate, iron(II) metal pyrophosphate or iron(II) metal metaphosphate of the general formula $Fe_aMet_b(PO_c)_d$, where a is a number from 1 to 5, b is a number from >0 to 5, c is a number from 2.5 to 5, d is a number from 0.5 to 3 and Met represents one or more metals selected from the group consisting of Li, Na, K, Rb, Cs, Mg, Ca, Sr, Ba, the transition metals (d block), in particular Sc, Y, La, Ti, Zr, Hf, Nb, Ta, Cr, Mo, W, Mn, Cu, Zn, Co, Ni, Ag, Au, the metals and semimetals of the third, fourth and fifth main groups, in particular B, Al, Ga, In, Si, Sn, Sb, Bi and the lanthanoids or combinations of the above mentioned phosphates as absorbers of electromagnetic radiation, with the absorber being finely distributed or dissolved in a carrier material.

Surprisingly, it was found that crystal water-free monometallic iron(II) orthophosphate according to the invention and crystal water-free mixed metal iron(II) metal phosphates, iron(II) metal phosphonates, iron(II) metal pyrophosphates of the general formula $Fe_aMet_b(PO_c)_d$ have very good absorption properties in the NIR range of the electromagnetic spectrum and like copper hydroxide phosphate only have low levels of absorption in the visible wavelength spectrum of 380-780 nm and therefore rarely have a colour themselves.

In an embodiment of the invention the absorber is crystal water-free iron(II) orthophosphate of the general formula $Fe_3(PO_4)_2$ and has the graftonite crystal structure.

Other crystal structures of crystal water-free $Fe_3(PO_4)_2$ are also known, for example the sarcopside crystal structure which is an isotype of the olivin-like structure of $Ni_3(PO_4)_2$. In comparison with this, the crystal water-free $Fe_3(PO_4)_2$ in the graftonite crystal structure has shown itself to be a particularly advantageous absorber with a very high level of absorption in the wavelength range of approximately 800-1250 nm, better still in the wavelength range of 900-1100 and with an absorption maximum of around 1000 nm.

In contrast to this the absorption of $Fe_3(PO_4)_2$ with the sarcopside crystal structure over the wavelength range of 800-1250 nm is low compared to crystal water-free $Fe_3(PO_4)_2$ in the graftonite crystal structure.

Without aligning themselves to a theory, the inventors assume that the advantageous absorption properties of the Fe(II) compounds according to the invention are not solely due to the presence of the bivalent iron and the phosphate anions or phosphonate anions but rather also due to the lack of crystal water. In addition to this, it has advantageously been demonstrated that certain crystal structures are advantageous over other crystal structures, in particular the graftonite crystal structure of the crystal water-free iron(II) orthophosphate compared to the sarcopside crystal structure which is also known for iron(II) orthophosphate. Iron(II) orthophosphates which contain crystal water are also known, for example the octahydrate vivianite $Fe_3(PO_4)_2$ $8H_2O$, after which the vivianite crystal structure is named. This however does not have the advantageous absorption properties according to the invention. Iron(III) orthophosphate also does not have the advantageous absorption properties of crystal water-free iron(II) orthophosphate with a graftonite structure according to the invention.

The graftonite crystal structure of the crystal water-free iron(II) orthophosphate with the formula $Fe_3(PO_4)_2$ is named after the mineral graftonite $(Fe,Mn,Ca,Mg)_3(PO_4)_2$. The crystal system is monocline, the space group is $P2_1/c$ and the lattice constants are around $a\approx8.81$ Å, $b\approx11.56$ Å, $c\approx6.14$ Å, $\alpha\approx90.00°$, $\beta\approx99.35°$, $\gamma\approx90.00°$. The unit cell contains eight formula units $Fe_{1.5}PO_4$. The phosphorous is tetrahedrally coordinated by the oxygen, and iron(II) occurs in three different four-fold layers (4e), each with different coordination geometries: 1× distorted octahedral, with one of the coordinated oxygen ions being significantly further away (d~2.68 Å), and 2× trigonal bipyramidal. The iron atoms in the graftonite system are therefore coordinated without an inversion centre. The significant deviation from the densest packing of the anion is probably due to the optimisation of coordination requirements.

The very good absorption of the crystal water-free iron(II) orthophosphate in the graftonite crystal structure in the NIR range and the excellent suitability as an absorber in various applications as described here was surprising. Without committing to a theory, the inventors explain the good absorption properties as follows.

The absorption of electromagnetic radiation through transition metal complexes is among other things caused by electron transitions within the d-shell. The absorption likelihood of these transitions depends significantly on the transition metal complexes. Since electronic transitions of the same orbital parity are forbidden in centrosymmetrical molecules (Laporte rule), the absorption of these is correspondingly low, as is the case for iron(III) orthophosphate, $FePO_4$, in which the iron is coordinated in an octahedral manner.

However, if the molecule does not have an inversion centre, as is the case with the crystal water-free iron(II) orthophosphate with the graftonite structure according to the invention but also in the case of mixed metal iron(II) compounds of the general formula $Fe_aMet_b(PO_c)_d$ according to the invention, the Laporte rule no longer applies and absorption is correspondingly higher. The absorbers according to the invention are therefore transition metal complexes of iron which have a crystal structure in which the complex does not have an inversion centre relative to the central atom.

This coordination is surprisingly advantageous compared to the crystal structures of for example vivianite, $Fe_3(PO_4)_2.8 H_2O$, or crystal water-free iron(II) orthophosphate, $Fe_3(PO_4)_2$, in the sarcopside crystal structure, which has an octahedral coordination with an inversion centre relative to the central iron atom. This obviously makes the absorption correspondingly lower than in the compounds according to the invention in the NIR range.

Corresponding considerations also apply to the crystal water-free iron(II) metal orthophosphates, phosphonates, pyrophosphates and metaphosphates of the general formula $Fe_aMet_b(PO_c)_d$ according to the invention where these have iron coordination with no inversion centre.

Preferred crystal water-free iron(II) metal phosphates according to the invention are the compounds $SrFeP_2O_7$, $BaFeP_2O_7$, $KFePO_4$, $K(Fe_{0.75}Zn_{0.25})PO_4$ and $K(Fe_{0.75}Mg_{0.25})PO_4$. For example, $SrFeP_2O_7$ and $BaFeP_2O_7$ have a defined structure as a result of trigonal bipyramids or as a result of quadratic pyramids and at the same time have a very high level of absorption in the NIR range in the case of wavelengths of around 800-1150 nm and around 1800-2500 nm.

Compounds according to the invention with tetrahedral coordination of the iron(II) atoms also do not have an inversion centre and show pronounced absorption in the NIR range. Iron (II) metal orthophosphates, iron(II) metal phosphonates, iron(II) metal pyrophosphates and iron(II) metal metaphosphates with tetrahedral coordination are therefore also preferred according to the invention. Particularly preferred among these are crystal water-free $KFePO_4$, $K(Fe_{0.75}Zn_{0.25})PO_4$ and $K(Fe_{0.75}Mg_{0.25})PO_4$. In these crystal water-free iron(II) metal phosphates absorption in the MR range is particularly pronounced and extends in an almost even shape across the entire IR range from around 780 nm to 2500 nm and beyond. It is advantageous to use these in particular in areas of application in which broad absorption across the entire IR range is desired, like for example in packaging materials, the aim of which is to protect the packaged products, such as food from IR radiation.

The absorber is generally finely distributed in the carrier material. Depending on the carrier material and the absorber, it can also be fully or partially dissolved in the carrier material.

In a preferred embodiment of the invention, the absorber is present in the carrier material in a concentration of 1 ppm to 20% by weight or from 10 ppm to 10% by weight in a finely distributed or dissolved manner, preferably in a concentration of 10 ppm to 10% by weight or of 100 ppm to 5% by weight based on the total weight of the carrier material with any aggregates it contains including the absorber. In the context of the present invention, the total weight of the carrier material is always based on the total mass of the carrier material and the mass of the substances added. If the percentage of the absorber is too low, the absorption effect can be too low for the intended application. The percentage of the absorber being too high, however, can lead to an impairment of the material properties of the carrier material. The selection of a carrier material that is suitable and desirable for each application, the absorber according to the invention and the necessary or suitable quantity of absorber is conveyed to the person skilled in the art who has knowledge of the invention on the basis of his technical knowledge and taking into account the examples set out here.

The compounds in the present invention offer a wide range of advantages compared to other absorbers. The can be manufactured relatively easily and for comparatively low costs and are characterised for example by high levels of stability compared to organic or metal organic absorbers. They are crystal water-free, resulting in all of the radiation being absorbed by the actual complex rather than some of it being absorbed by the crystal water. Furthermore, they have particularly high levels of absorption in the NIR range but only weak levels of absorption in the visible range of electromagnetic radiation, resulting in them not having a colour themselves or having very little colour and not having a major impact on the colour of the carrier material but with the complex very easily being able to be activated by means of NIR radiation.

Compounds with a maximum level of absorption in the wavelength range of short-wave NIR radiation (IR-A) of around 780-1450 nm have the advantage that in this IR range a higher quantity of energy can be taken in than as a result of the absorption of long-wave NIR radiation (IR-B) of around 1450-3000 nm and therefore a greater level of heating of the carrier material can be achieved in corresponding applications.

Particularly advantageous compounds according to the invention are those NIR absorbers which show low levels of absorption in the visible range and high levels in the short-wave NIR range of the electromagnetic spectrum. The ratio between the maximum absorption of the electromagnetic radiation in the wavelength range of short-wave NIR radiation (IR-A) of 780-1450 to the maximum absorption of electromagnetic radiation in the visible wavelength range of 380-780 nm (VIS) should expediently be at least 1.3, preferably at least 1.6, particularly preferably at least 1.8.

In uses according to the present invention, it can be advantageous to use laser beams as the source of the radiation of the carrier material in which the absorber is finely distributed or dissolved, preferably laser beams with a wavelength in the region of 780 nm to 1500 nm, particularly preferably in the region from 900 nm to 1200 nm. The use of what are known as excimer lasers as known from photolithography is suitable for this. Particularly suitable excimer lasers are ArF, KrF, XeCl, XeF and KrCl lasers. The use of Nd:YAG lasers as known from medical technology is also advantageous, with these preferably being used at a wavelength of 1064 nm or 946 nm, in other words in the NIR range. Laser beams are particularly suitable for achieving sharp contours for the radiation and a locally narrowly delimited high energy input where this is desirable or necessary. Uses according to the invention in which laser beams are particularly advantageous in terms of the irradiation of the carrier material are for example laser welding, laser marking and the creation of electrically conductive metal structures, preferably from conduction pathway structures on a non-conductive carrier material (LDS method).

A carrier material in the context of the invention could be any organic or inorganic material that can contain the absorber for use according to the invention in a finely distributed or dissolved manner. The absorber is preferably evenly distributed in the carrier material, as even distribution of this type is very easy to achieve using common processing methods such as extrusion. Alternatively, there is also an option for the absorber to be more highly concentrated in certain regions of the carrier material than in others. The absorber can also be found in the carrier material or in a section of the carrier material with a concentration difference characterised by a concentration gradient. Targeted accumulation in a region can lead to improved material properties and to advantageous absorption properties, for example if targeted absorption in the surface region of the carrier material and less so in the deeper regions is desirable.

According to the invention the carrier material is preferably selected from the group consisting of thermoplastic polymers, duroplastic polymers, oxidic ceramics, non-oxidic ceramics, glasses, hot-melt adhesives, dyes, varnishes and silicons, papers, pulps and cardboard, and suspensions with various suspension agents.

The carrier material is particularly preferably a thermoplastic polymer selected from the group consisting of polyvinyl butyral (PVB), polypropylene (PP), polyethylene (PE), polyamide (PA), polyesters such as polybutylene terephthalate (PBT), polyethylene terephthalate (PET), polyphenylene oxide, polyacetal, polymethacrylate, polyoxymethylene, polyvinyl acetal, polystyrene, acryl butadien styrene (ABS), acrylonitrile styrene acrylate (ASA), polycarbonate, polyethersulfone, polysulfonate, polytetrafluoroethylene, polyurea, formaldehyde resins, melamine resins, polyetherketone, polyvinyl chloride, polylactide, polysiloxane, phenol resins, epoxide resins, poly(imide), bismaleimide-triazine, thermoplastic polyurethane, copolymers and/or mixtures of the polymers mentioned above.

In most cases, thermoplastic polymers are colourless and their colours and/or transparency are not or are only slightly impacted by the addition of the absorber according to the invention, which in the case of many applications is particularly advantageous. Absorbers according to the invention generally have a long shelf life and a high level of stability. They are highly temperature resistant, so even compounding or injection moulding in combination with high-temperature plastics such as polyaramides or liquid crystal polymers (LCPs) is possible.

In a preferred embodiment of the invention the absorber has an average particle size (d50 value) in the region of 0.01 µm to 50 µm, preferably 0.1 to 20 µm, particularly preferably 1 µm to 10 µm. Particle sizes which are too low have the disadvantage of leading to agglomerates which then in turn have to be broken up. Particle sizes which are too high have the disadvantage of making it impossible, for example, to produce thin films or very thin components. The introduction of particles of a low particle size means the material properties are less significantly affected than they are by high particle sizes and more even absorption behaviour is achieved and local overheating avoided.

The person skilled in the art can use common methods such as light scattering and microscopic methods to determine the average particle size. The average particle size according to the invention specified herein was determined used a laser particle size measuring device (model LA-950V2 by Horiba; software version 7.2).

The absorbers according to the invention are particularly stable in terms of temperature compared to many known absorbers. In the context of the present invention, this means that no significant conversion, decomposition or hydration processes occur in a certain temperature range. In order to check the temperature stability of the absorber, a sample of the absorber is exposed to a defined temperature for 16 h and after the temperature treatment the absorption of a defined quantity of a temperature-treated absorber is compared with that of the untreated absorber at a certain wavelength or within a certain wavelength range. The comparison should advantageously be carried out at the wavelength of the maximum absorption of the untreated absorber. An absorber is deemed to be stable in terms of temperature if the absorption of the temperature-treated absorber is >80%, preferably >90%, particularly preferably >95% of that of the untreated absorber.

In the uses according to the invention, the carrier material advantageously does not contain any additives which release gas following heating to 300° C., preferably to 400° C., particularly preferably to 500° C., and/or following exposure to electromagnetic radiation through decay, chemical conversion or a reaction with the content of the carrier material or the carrier material itself, at least not in significant quantities, which could have a negative impact on the material properties of the carrier material. The material properties of the carrier material can be degraded as a result of the gas which forms and foams up. The percentage of additives to the carrier material which release gas, if the carrier material contains any of these, is therefore preferably less than 1% by weight, more preferably less than 0.1% by weight, particularly preferably less than 0.01% by weight of the total mass of the carrier material.

The present invention comprises the use of the absorber according to the invention to manufacture products which consist of or comprise the carrier material, whereby the carrier material contains the absorber in a quantity such that it absorbs infrared radiation where the wavelength is at least in the region from 780 nm to 1400 nm more strongly than the same polymer which does not contain the absorber. Products according to the invention are described in greater detail below.

a) Advantageous according to the invention is the use of the absorber according to the invention to manufacture packaging material for commercial products, whereby the carrier material is a thermoplastic polymer or duroplastic polymer, preferably a transparent polymer or a duroplastic polymer.

The use of absorbers in packaging materials means that commercial products which are sensitive to radiation such as foods but also products which may for example change their colour as a result of longer-lasting radiation are protected from radiation and/or warming by means of light or sun radiation. In the case of foods, this can significantly increase their shelf life without coloured packaging materials having to be used. In this way, the products can be presented to consumers through the packaging materials while at the same time the products are protected from harmful radiation.

Furthermore, the prevention of radiation can also decrease decomposition reactions and damage to the packaging material itself, in particular of thermoplastic or duroplastic materials, such as cross-linking, embrittlement or fading of the material.

In addition to this, the compounds according to the invention are for the most part toxocologically and ecologically harmless, which is why they are particularly suitable for use in food packaging or for the packaging of children's toys for example compared to many other NIR absorbers. They did not release any substances which are harmful to health or affect the taste of an item, and they also do not have a negative impact on the material properties of the packaging material.

In a preferred embodiment of this use, the absorber is an iron(II) metal orthophosphate, an iron(II) metal phosphonate, an iron(II) metal pyrophosphate or an iron(II) metal metaphosphate with a tetrahedral structure, preferably $KFePO_4$, $Fe(_{0.75}Zn_{0.25})PO_4$ or $K(Fe_{0.75}Mg_{0.25})PO_4$, as these absorbers have a high absorption across a very wide range, almost the entire NIR spectrum, such as that which can be found in solar radiation, and therefore protect the product and/or the packaging material.

b) Advantageous according to the invention is also the use of the absorber according to the invention to manufacture window panes, with the carrier material advantageously being a transparent thermoplastic polymer, a transparent duroplastic polymer or glass.

When window panes are used, particularly those made out of thermoplastic material such as for example polymethyl methacrylate or polycarbone, warming inside the area closed off by the window panes often occurs as a result of the solar exposure. The warming occurs as a result of the absorption of NIR radiation and the conversion of this into long-wave thermal radiation through components behind the window panes if the NIR radiation can pass the panes unhindered. Since long-wave thermal radiation is only radiated back outwards to a limited extent, a "greenhouse effect" occurs. In order to keep this as low as possible, the transmission of NIR radiation through the window panes should be minimised as far as possible. Most of the NIR absorbers known from the prior art for window panes are based on rare earth metal or transition metal compounds, which either have a colour themselves or are hard to procure and expensive. The iron compounds according to the invention offer the opportunity to manufacture transparent window panes in a simple manner and at low cost. By the absorption of radiation warming behind the window panes caused by penetrating radiation is reduced considerably.

In a preferred embodiment of this use, the absorber is an iron(II) metal phosphate, phosphonate, pyrophosphate or metaphosphate with a tetrahedral structure, preferably $KFePO_4$, $Fe(_{0.75}Zn_{0.25})PO_4$ or $K(Fe_{0.75}Mg_{0.25})PO_4$, as these absorbers have a very high absorption across a very wide range, almost the entire IR spectrum, such as that which can be found in the solar radiation, and therefore prevent warming caused by radiation from essentially the whole IR range.

c) Advantageous according to the invention is also the use of the absorber according to the invention to manufacture preforms which are provided and designed for further processing into end products, preferably into containers, particularly preferably into food containers or bottles in a thermal reshaping process, preferably in a stretching process or a stretch blow process, whereby the carrier material is a thermoplastic polymer, preferably a transparent thermoplastic polymer.

Thermal polymer reshaping procedures such as stretching or stretch blowing are mostly complex and energy-intensive procedures with low levels of process flexibility. Procedures of this kind can be made more flexible and more efficient by means of the use according to the invention of NIR absorbers in polymer handling processes. The precise applicability and the dosing ability in terms of location and time of IR radiation mean that the processing can be adapted to the respective needs and requirements at any time. In this context, it is advantageous that the NIR absorbers according to the invention have a high degree of temperature resistance.

d) Advantageous according to the invention is also the use of the absorber according to the invention to manufacture end products from thermoplastic polymers which are manufactured in a thermal reshaping procedure, preferably in a stretching process or stretch blow process;

A further preferred embodiment of the invention comprises the use of the absorber as a heating accelerator and/or polymerisation accelerator and/or cross-linking accelerator in thermoplastic or duroplastic materials, hot-melt adhesives, dyes, varnishes or silicones with exposure to radiation with electromagnetic radiation, preferably with exposure to infrared radiation with a wavelength of at least in the region of 780 nm to 1400 nm.

Since the radiation loss caused by transmission or light dispersion is less in carrier materials which contain the absorber according to the invention than in materials which do not contain the additive according to the invention, heating can be carried out at a higher heating rate with the same radiation power and as a result the necessary output of the radiator and/or the duration of radiation are reduced significantly. The high absorption rate can also be used to accelerate chemical polymerisation reactions and/or cross-linking reactions. This can either occur due to the increase in temperature as a result of the elevated radiation absorption or by means of the transfer of energy from the IR absorber to a component in the chemical reaction.

The use of absorbers according to the invention is particularly preferred in thermally induced polymerisation or cross-linking reactions such as for example radical polymerisation and for the MR hardening of varnishes, for example clear varnishes, which generally only absorb very poorly in the NIR range and therefore only harden slowly. The use of absorbing additives is known for applications of this type, but additives of this type are known to have disadvantages. For example, $TiO_2$ reflects in the NIR range, while soot has a high level of absorption but leads to a change in colour in the visible range of light. The use of absorbers according to the invention is therefore particularly advantageous as a result of the high belt speeds and a low level of thermal load on the substrates in the hardening process. The hardening of varnishes with the absorbers according to the invention generally occurs significantly more quickly than without the absorber without other additives having to be used and leading to disadvantages.

The present invention also includes the use of the absorber according to the invention as an absorber of electromagnetic radiation in laser marking, laser inscription, laser welding and/or polymer joining. Here, too, it is generally transparent or dyed thermoplastic or duroplastic polymers which are used as carrier materials. The use of lasers mean that very specific regions can be exposed to radiation and locally heated in this procedure, so that sharp contours and precise structures can be achieved when laser marking, laser inscribing and laser welding.

In a preferred embodiment the absorber is used as an absorber of infrared radiation as part of the use according to the invention in the manufacture of electrically conductive metal structures, preferably conductive pathway structures, on a non-conductive carrier material (LDS procedure).

The invention is now explained further using examples of manufacturing for absorbers according to the invention and using examples of uses according to the invention and the attached figures.

EXAMPLES

X-Ray Diffractometry (XRD)

Of the products manufactured according to the examples below, x-ray diffraction measurements (XRD) are taken using a D8 Advance A25-type diffractometer (Bruker) and CuKα radiation.

The products and their crystal structures were identified on the basis of corresponding reference diffractograms (Powder Diffraction Files; PDF) from the ICDD (International Centre for Diffraction Data), previously JCPDS (Joint Committee on Powder Diffraction Standards) database. If no PDF cards were available for the products manufactured, PDF cards for isotype compounds were used (=compounds of the same structural type).

Elementary Analysis

Elementary analyses were carried out by means of x-ray fluorescence analysis (XRF) using an Axios FAST spectrometer (PANalytical) in order to determine and confirm the stoichiometries of the products manufactured.

Manufacturing Example 1

Crystal Water-Free $Fe_2P_2O_7$

Figure 1:
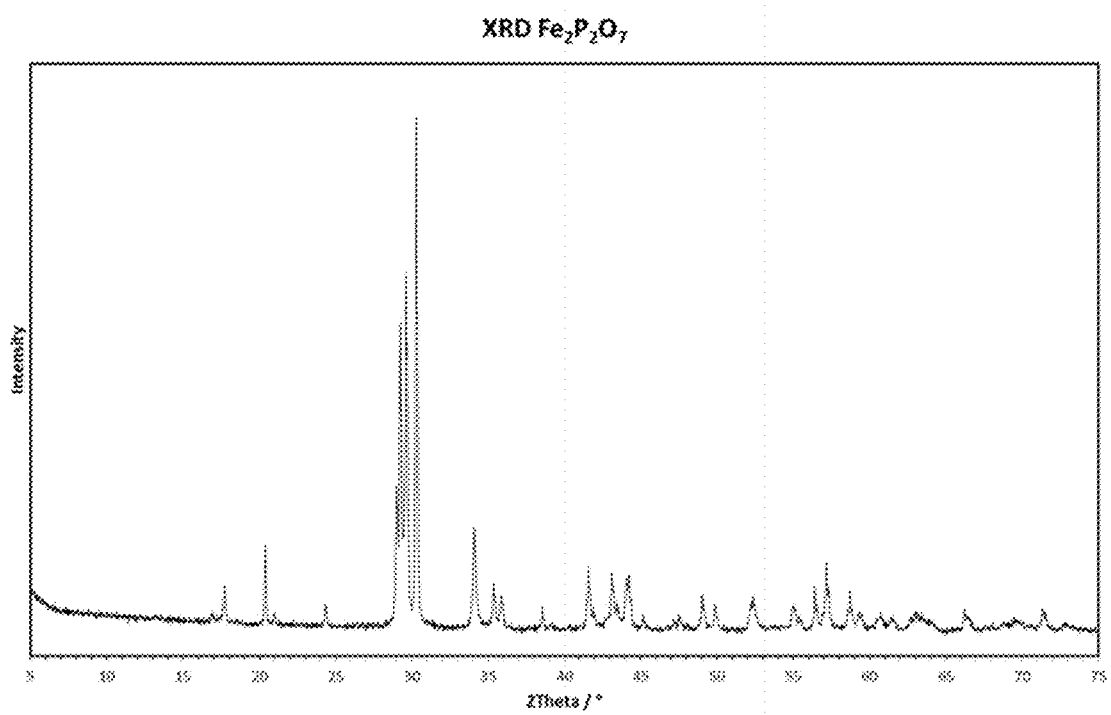
FIG. 1 shows the x-ray diffractogram of crystal water-free $Fe_2P_2O_7$ manufactured in accordance with the invention in line with manufacturing example 1.

A suspension of
i) 35.5 kg iron(III) oxide-hydroxide [FeO(OH) or $Fe_2O_3$ $1H_2O$],
ii) 16.5 kg 98% phosphonic acid [$H_3PO_3$],
iii) 26.5 kg 75% phosphoric acid [$H_3PO_4$] and
LA: 220 kg water
was spray granulated. The granulate obtained in this way was temperature treated in a rotary kiln for an average residence time of 4 h in a form gas atmosphere (5% by volume $H_2$ in $N_2$) at 700° C. An almost colourless to slightly pink product is obtained. The x-ray diffractogram (XRD) of the product is shown in FIG. 1. The product was identified using PDF card 01-072-1516.

Manufacturing Example 2

Phase Mixture of Crystal Water-Free $Mg_{1.5}Fe_{1.5}$ $(PO_4)_2$ and $Fe_3(PO_4)_2$ A suspension of
i) 8.45 kg iron(III) oxide-hydroxide [FeO(OH) or $Fe_2O_3$ $1H_2O$],
ii) 7.95 kg 98% phosphonic acid [$H_3PO_3$],
iii) 19.6 kg iron(III) phosphate dihydrate [$FePO_4$ $2H_2O$],
iv) 8.43 kg magnesium carbonate [$MgCO_3$] and
LA: 160 kg water
was spray granulated. The granulate obtained in this way was temperature treated in a rotary kiln for an average residence time of 3 h in a form gas atmosphere (5% by volume $H_2$ in $N_2$) at 750° C.

Figure 2:
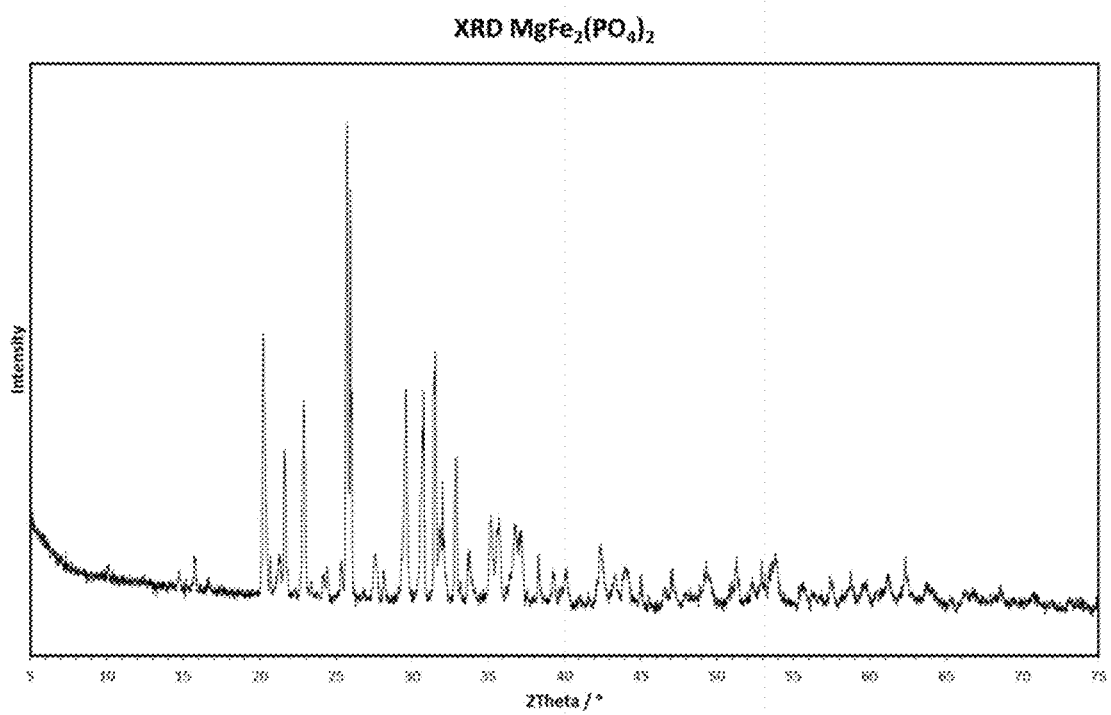
FIG. 2 shows the x-ray diffractogram of a phase mixture of crystal water-free $Mg_{1.5}Fe_{1.5}(PO_4)_2$ and $Fe_3(PO_4)_2$ manufactured in accordance with the invention in line with manufacturing example 2.

An almost colourless product is obtained. The x-ray diffractogram (XRD) of the product is shown in FIG. 2. The product was identified using the PDF cards as a phase mixture of a main phase $Mg_{1.5}Fe_{1.5}(PO_4)_2$ (PDF card 01-071-6793) and a subsidiary phase $Fe_3(PO_4)_2$ (PDF card 00-49-1087).

Manufacturing Example 3

Crystal Water-Free $Fe_3(PO_4)_2$

Figure 3:
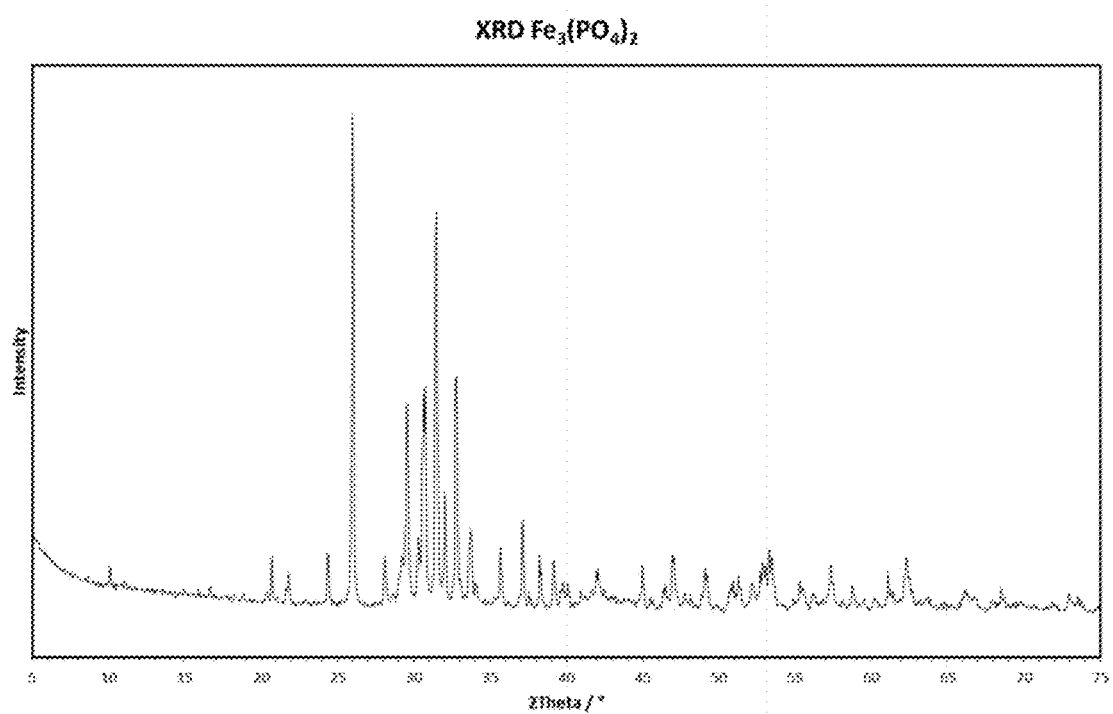
FIG. 3 shows the x-ray diffractogram of crystal water-free $Fe_3(PO_4)_2$ manufactured in accordance with the invention in line with manufacturing example 3.

A suspension of
i) 21.75 kg iron(III) oxide-hydroxide [FeO(OH) or $Fe_2O_3$ $1H_2O$],
ii) 12.15 kg 98% phosphonic acid [$H_3PO_3$],
iii) 10.3 kg iron(III) phosphate dihydrate [$FePO_4$ $2H_2O$] and
LA: 140 kg water
was spray granulated. The granulate obtained in this way was temperature treated in a rotary kiln for an average residence time of 90 minutes in a form gas atmosphere (5% by volume $H_2$ in $N_2$) at 750° C. An almost colourless product is obtained. The x-ray diffractogram (XRD) of the product is shown in FIG. 3. The product crystallises in the graftonite structure and was identified using PDF card 00-49-1087. The product was ground such that 50% by weight of the product had a particle size of less than 3 μm.

Manufacturing Example 4

Manufacture of Crystal Water-Free $KFe(PO_4)$

Figure 4:
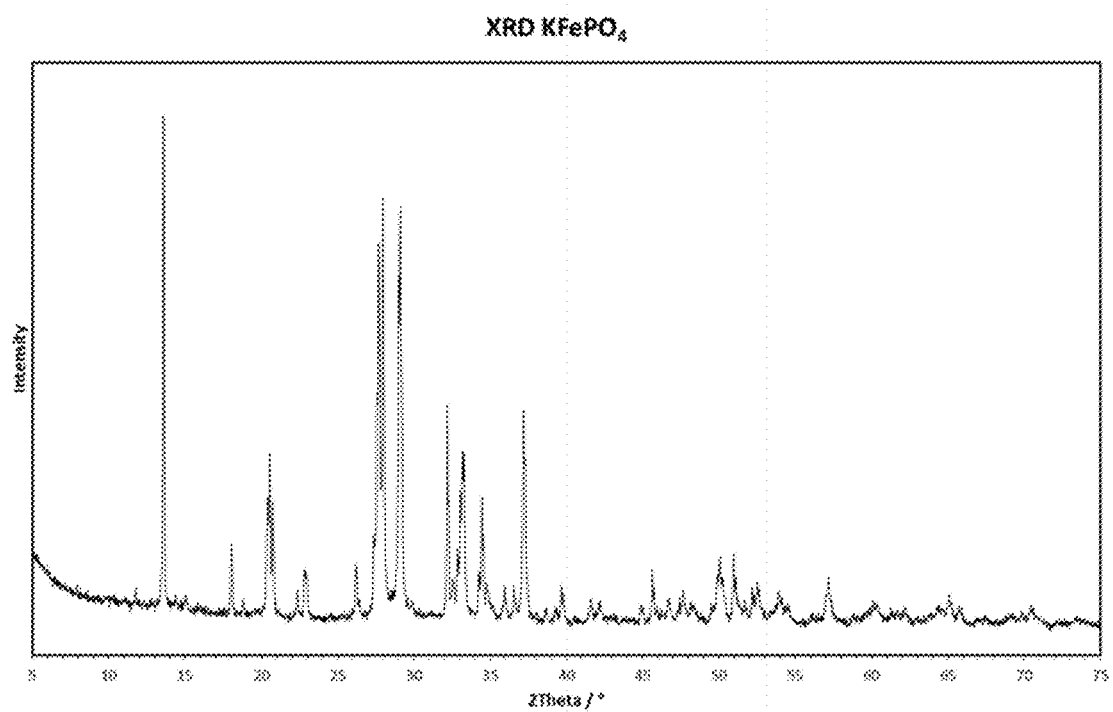
FIG. 4 shows the x-ray diffractogram of crystal water-free $KFe(PO_4)$ manufactured in accordance with the invention in line with manufacturing example 4.

A suspension of
i) 11.80 kg iron(III) oxide-hydroxide [FeO(OH) or $Fe_2O_3$ $1H_2O$],
ii) 10.70 kg 98% phosphonic acid [$H_3PO_3$],
iii) 24.8 kg iron(III) phosphate dihydrate [$FePO_4$ $2H_2O$]
IV) 29.8 kg 50% lye [KOH]
V) 1.0 kg 75% phosphoric acid [$H_3PO_4$] and
LA: 110 kg water
was spray granulated. The granulate obtained in this way was temperature treated in a rotary kiln for an average residence time of 3 h in a form gas atmosphere (5% by volume $H_2$ in $N_2$) at 650° C. A pale light green product is obtained. The x-ray diffractogram (XRD) of the product is shown in FIG. 4. The product was identified using PDF card 01-076-4615.

Manufacturing Example 5

Crystal Water-Free $KFe_{0.90}Zn_{0.10}(PO_4)$

Figure 5:
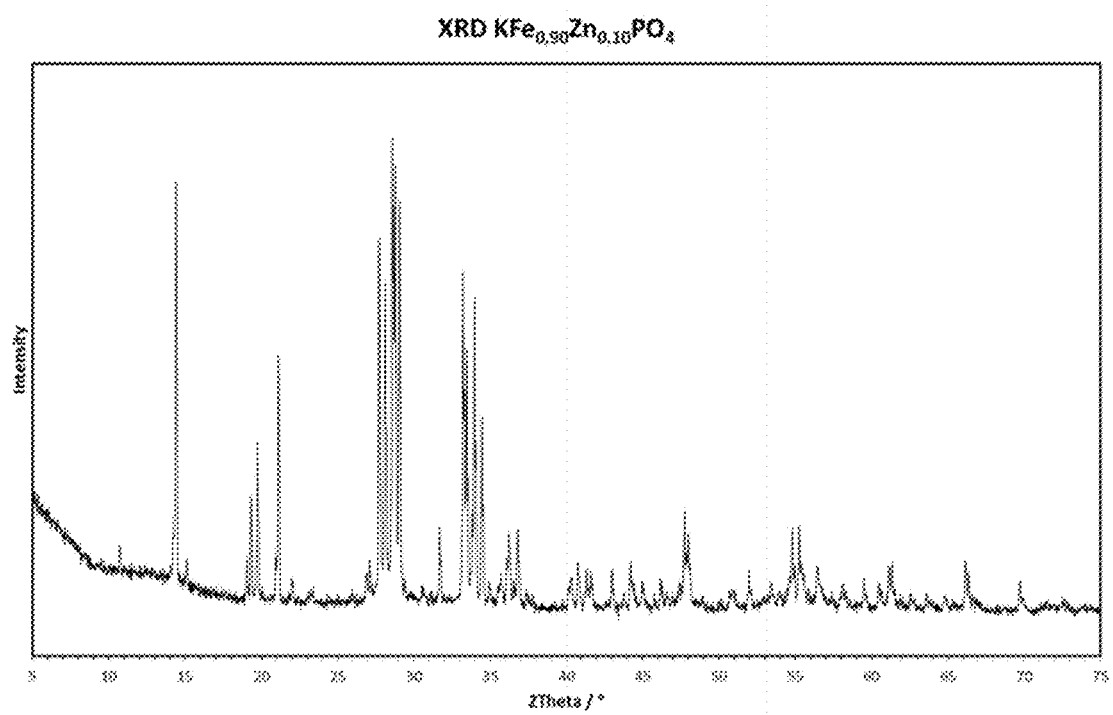
FIG. 5 shows the x-ray diffractogram of crystal water-free $KFe_{0.90}Zn_{0.10}(PO_4)$ manufactured in accordance with the invention in line with manufacturing example 5.

A suspension of
i) 10.60 kg iron(III) oxide-hydroxide [FeO(OH) or $Fe_2O_3$ $1H_2O$],
ii) 9.65 kg 98% phosphonic acid [$H_3PO_3$],
iii) 22.30 kg iron(III) phosphate dihydrate [$FePO_4$ $2H_2O$]
IV) 2.15 kg zinc oxide [ZnO]
IV) 29.8 kg 50% lye [KOH]
V) 4.15 kg 75% phosphoric acid [$H_3PO_4$] and
LA: 120 kg water
was spray granulated. The granulate obtained in this way was temperature treated in a rotary kiln for an average residence time of 2 h in a form gas atmosphere (5% by volume $H_2$ in $N_2$) at 600° C. An light grey product is obtained. The x-ray diffractogram (XRD) of the product is shown in FIG. 5. The product is a new structure type which appears to be closely linked to the $KFe(PO_4)$ structure according to PDF card 01-076-4615.

Manufacturing Example 6

Crystal Water-Free $KFe_{0.75}Zn_{0.25}(PO_4)$

Figure 6:
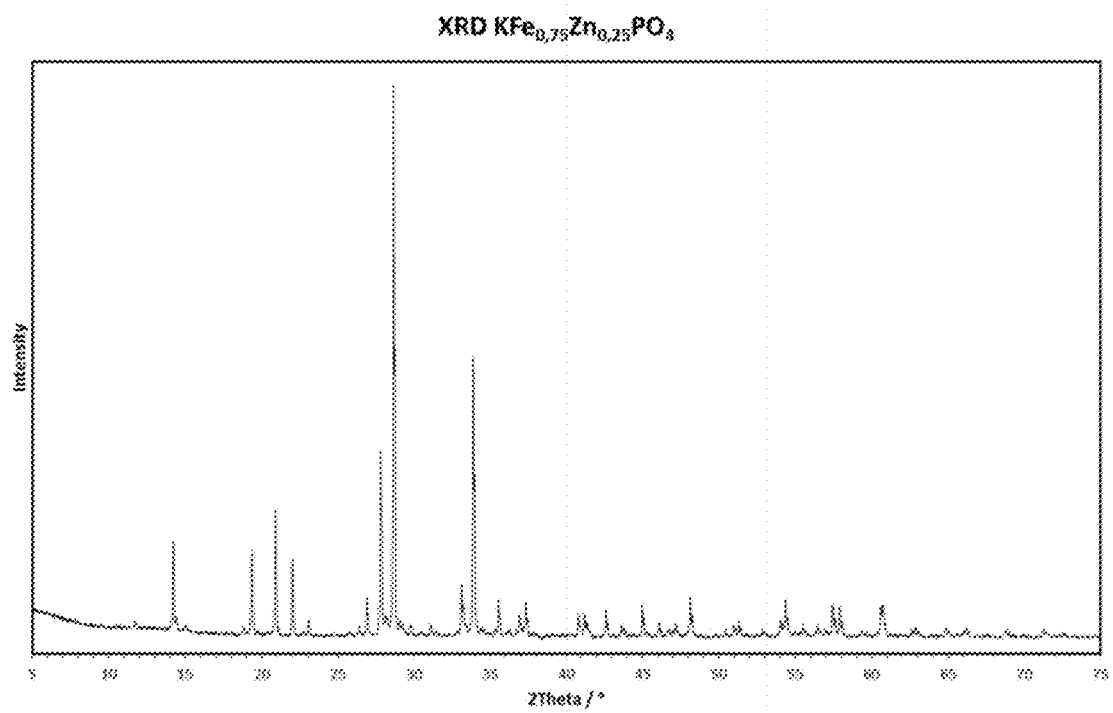
FIG. 6 shows the x-ray diffractogram of crystal water-free $KFe_{0.75}Zn_{0.25}(PO_4)$ manufactured in accordance with the invention in line with manufacturing example 6.

A suspension of
i) 8.85 kg iron(III) oxide-hydroxide [FeO(OH) or $Fe_2O_3$ $1H_2O$],
ii) 8.05 kg 98% phosphonic acid [$H_3PO_3$],
iii) 18.60 kg iron(III) phosphate dihydrate [$FePO_4$ $2H_2O$]
IV) 5.40 kg zinc oxide [ZnO]
IV) 29.8 kg 50% lye [KOH]
V) 9.30 kg 75% phosphoric acid [$H_3PO_4$] and
LA: 120 kg water
was spray granulated. The granulate obtained in this way was temperature treated in a rotary kiln for an average residence time of 2 h in a form gas atmosphere (5% by volume $H_2$ in $N_2$) at 600° C. A light grey product is obtained. The x-ray diffractogram (XRD) of the product is shown in FIG. 6. The product is not known from the literature. It crystallises in an isotype manner to form $KZn(PO_4)$ according to PDF card 01-081-1034.

Manufacturing Example 7

Crystal Water-Free KFe$_{0.75}$Mn$_{0.25}$(PO$_4$)

Figure 7:
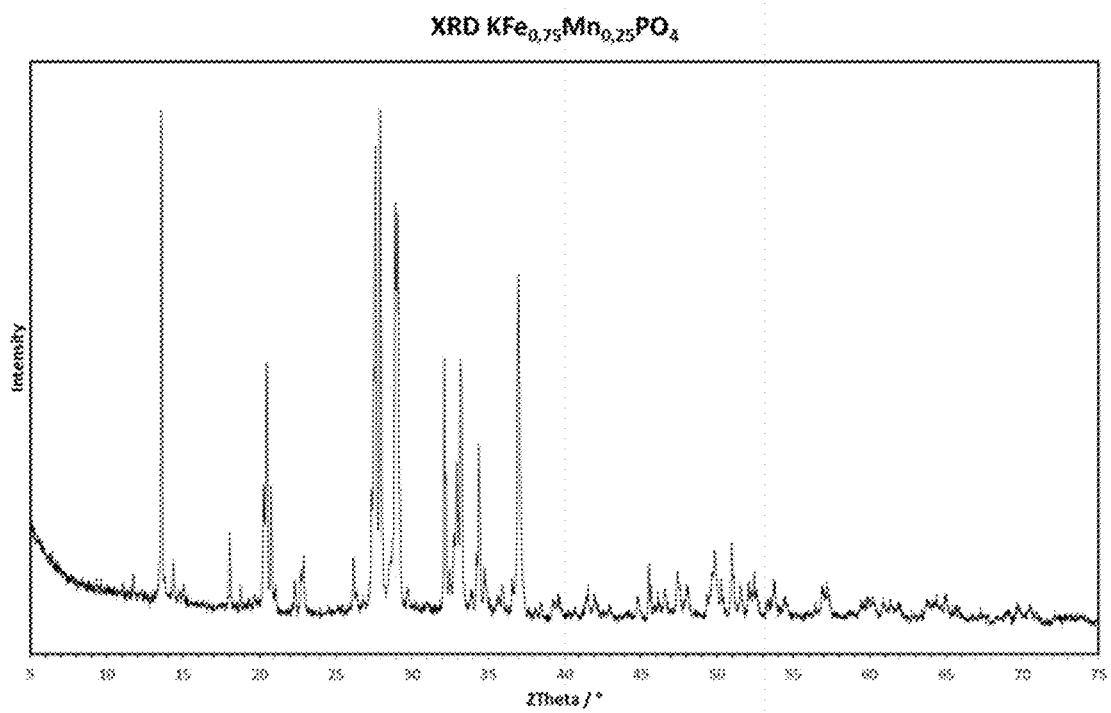
FIG. 7 shows the x-ray diffractogram of crystal water-free $KFe_{0.75}Mn_{0.25}(PO_4)$ manufactured in accordance with the invention in line with manufacturing example 7.

A suspension of
i) 8.85 kg iron(III) oxide-hydroxide [FeO(OH) or Fe$_2$O$_3$ 1H$_2$O],
ii) 8.05 kg 98% phosphonic acid [H$_3$PO$_3$],
iii) 18.60 kg iron(III) phosphate dihydrate [FePO$_4$ 2H$_2$O]
IV) 8.85 kg manganese carbonate hydrate [MnCO$_3$ H$_2$O]
IV) 29.8 kg 50% lye [KOH]
V) 9.30 kg 75% phosphoric acid [H$_3$PO$_4$] and
LA: 140 kg water
was spray granulated. The granulate obtained in this way was temperature treated in a rotary kiln for an average residence time of 2 h in a form gas atmosphere (5% by volume H$_2$ in N$_2$) at 600° C. A light grey product is obtained. The x-ray diffractogram (XRD) of the product is shown in FIG. 7.

The product is not known from the literature. It crystallises in an isotype manner to form KFe(PO$_4$) according to PDF card 01-076-4615.

Manufacturing Example 8

Crystal Water-Free BaFeP$_2$O$_7$

Figure 8:
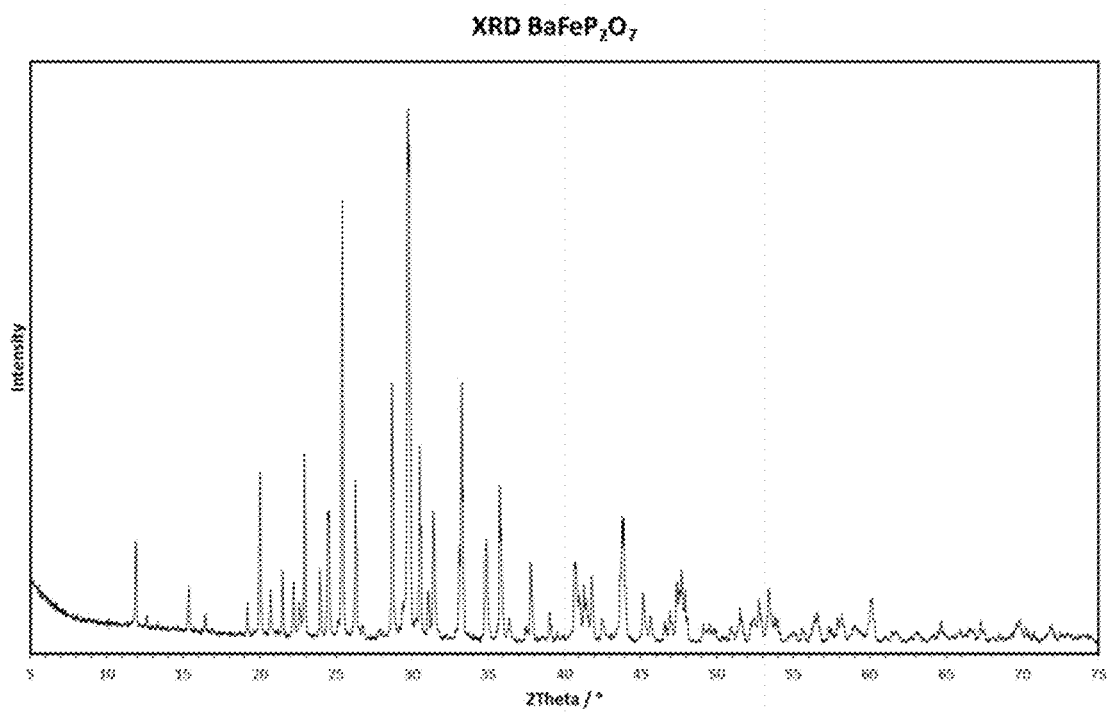
FIG. 8 shows the x-ray diffractogram of crystal water-free $BaFeP_2O_7$ manufactured in accordance with the invention in line with manufacturing example 8.

A suspension of
i) 8.70 kg iron(III) oxide-hydroxide [FeO(OH) or Fe$_2$O$_3$ 1H$_2$O],
ii) 8.20 kg 98% phosphonic acid [H$_3$PO$_3$],
iii) 19.05 kg iron(III) phosphate dihydrate [FePO$_4$ 2H$_2$O]
IV) 63.09 kg barium hydroxide octahydrate [Ba(OH)$_2$ 8H$_2$O]
V) 26.15 kg 75% phosphoric acid [H$_3$PO$_4$] and
LA: 250 kg water
was spray granulated. The granulate obtained in this way was temperature treated in a rotary kiln for an average residence time of 4 h in a form gas atmosphere (5% by volume H$_2$ in N$_2$) at 800° C. A light grey product is obtained. The x-ray diffractogram (XRD) of the product is shown in FIG. 8. The product crystallises in an isotype manner to form BaCoP$_2$O$_7$ according to PDF card 01-084-1833.

Example Use 1

Laser Welding)

Two percent by weight of the absorber Fe$_3$(PO$_4$)$_2$ according to manufacturing example 3 was evenly distributed in a polyethylene (Lupolen 1800S by BASF) using an extruder (ZSK18-type by Coperion GmbH). Plates of 3 cm×4 cm×3 mm were then prepared from the extrudate. A plate with the same dimensions was then manufactured but without the addition of the absorber. The plate without the absorber was placed over the plate with the absorber and the plates were then welded using an Nd:YAG laser with a wavelength of 1064 nm.

Example Use 2

LDS

The absorber material iron II magnesium phosphate according to the invention, a phase mixture of Mg$_{1.5}$Fe$_{1.5}$(PO$_4$)$_2$ and Fe$_3$(PO$_4$)$_2$ according to manufacturing example 2 were mixed with 1% by weight sodium dihydrogen pyrophosphate. Five percent by weight of the mixture was then worked into a polyamide 6.6 (Ultramid™ by BASF) using an extruder (ZSK18-type by Coperion GmbH) and a granulate manufactured. The granulate was then further processed to form plates of 3 cm×4 cm×3 mm. The plates were irradiated with an Nd:YAG laser (Trumpf) at a wavelength of 1064 nm and antennae structures generated which could then be used to receive electromagnetic radiation.

Example Use 3

Heating Rate

Five percent by weight of the absorber K(Fe$_{0.75}$Zn$_{0.25}$)PO$_4$ according to manufacturing example 6 was evenly distributed in a polypropylene (HE125MO by Borealis) using an extruder (ZSK18-type by Coperion GmbH). Plates of 3 cm×4 cm×3 cm were manufactured from the extrudate and were then radiated with a conventional IR lamp (red light lamp). The same polymer body although without the absorber additive was radiated in the same way for comparison purposes. The temperature of the body over time was recorded during the radiation. In the polymer body with the additive consisting of the absorber according to the invention a temperature of 77° C. was reached after one minute while in the polymer body without the addition of the absorber the temperature of 77° C. was only reached after five minutes of radiation. The temperature recording curve for the polymer body with the addition of the absorber according to the invention had almost twice as fast a heating rate than the temperature recording curve for the polymer body without the addition of the absorber over the entire time period.

Example Use 4

Laser Inscription/Laser Marking)

Two percent by weight of the absorber according to the invention KFe(PO$_4$) according to manufacturing example 4 was evenly worked into a polyethylene (Lupolen 1800S by BASF) using an extruder (ZSK18-type by Coperion GmbH). Plates of 3 cm×4 cm×3 mm were then prepared from the extrudate. Markings were then made on the surface of the plates by irradiation with an Nd:YAG laser with a wavelength of 1064 nm. The same polymer plates just without the absorber additive were laser marked in the same way for comparison purposes. In the polymer plates with absorbers according to the invention the markings were clearly visible even with a laser output of 1 watt and a frequency of 6000 Hz. There were no visible markings on the irradiated reference plate which did not contain absorbers under the same conditions.

Example Use 5

Heating of Preforms Using IR Radiation

Preforms were manufactured from a master batch of polyethylene terephthalate (PET) with 500 ppm K(Fe$_{0.75}$Zn$_{0.25}$)PO$_4$ according to manufacturing example 6 as they would be for the manufacture of drinks bottles. The same preforms but without the addition of absorber were also manufactured for comparison purposes. The preforms were heated using IR halogen heaters until glass transition point of the polymers. The energy required for heating was approximately 15% lower in the preforms with the added absorber and the time needed for the required irradiation was approximately 20% shorter than in the case of the preforms without absorber.

Example Use 6

Cross-Linking of Silicon

A non-cross-linked silicon mass was mixed with 0.05% by weight crystal water-free $Fe_3(PO_4)_2$ with a graftonite crystal structure according to manufacturing example 3 and then a conventional peroxide cross-linking agent was added. The silicon mass was then extensively heated using laser light at a wavelength of 980 nm using a VCSEL laser (Phillips). The same silicon mass not containing any absorber was treated in the same way for comparison purposes. The cross-linking of the silicon containing the absorber according to the invention was already complete after 110 seconds while the cross-linking of the silicon without the absorber took 120 seconds. The addition of small quantities of absorber according to the invention therefore meant that the energy required for cross-linking and therefore also the cross-linking time were able to be reduced.

Example Use 7

Laser Welding

Four percent by weight crystal water-free $Fe_3(PO_4)_2$ with a graftonite crystal structure according to manufacturing example 3 was worked evenly into a polyamide 6.6 (Ultramid™ by BASF) using an extruder (ZSK18-type by Coperion GmbH) and from this a moulded part for the automotive industry was manufactured which is used as a tail light in passenger vehicles. A further component which is to be connected (welded) to the above mentioned component was manufactured from the same material but without an absorber. The two components were then welded using a conventional diode laser with a wavelength of 940 nm. For comparison purposes, an attempt was made to weld corresponding components neither of which contained absorbers, but this was not possible without destruction.

The invention claimed is:

1. A method of using an absorber of electromagnetic radiation comprising:
    absorbing electromagnetic radiation with the absorber finely distributed or dissolved in a carrier material, wherein the absorber is:
    crystal water-free iron(II) orthophosphate of the general formula $Fe_3(PO_4)_2$ and being selected from compounds which have a crystal structure comprising transition metal complexes of iron in which the complex does not have an inversion center relative to the central atom, or
    crystal water-free iron(II) metal orthophosphate, iron(II) metal phosphonate, iron(II) metal pyrophosphate or iron(II) metal metaphosphate of the general formula $Fe_aMet_b(PO_c)_d$, where a is a number from 1 to 5, b is a number from >0 to 5, c is a number from 2.5 to 5, d is a number from 0.5 to 3 and Met represents one or more metals selected from the group consisting of Li, Na, K, Rb, Cs, Mg, Ca, Sr, Ba, the transition metals (d block), the metals and semimetals of the third, fourth and fifth main groups, and the lanthanoids or combinations of the above mentioned phosphates, and being selected from compounds which have a crystal structure comprising transition metal complexes of iron in which the complex does not have an inversion center relative to the central atom, and
    wherein the carrier material contains the absorber in a quantity such that it absorbs infrared radiation where the wavelength is at least in the region from 780 nm to 1400 nm more strongly than the same carrier material which does not contain the absorber.

2. The method according to claim 1, wherein the absorber is present in the carrier material in a concentration of 1 ppm to 20% by weight based on the total weight of the carrier material with any aggregates it contains including the absorber.

3. The method according to claim 1, wherein the carrier material is selected from the group consisting of thermoplastic and duroplastic polymers, oxidic ceramics, non-oxidic ceramics, glasses, hot-melt adhesives, dyes, varnishes, silicons, cardboards, papers, pulps and celluloses.

4. The method according to claim 1, wherein the carrier material is a thermoplastic polymer selected from the group consisting of polyvinyl butyral (PVB), polypropylene (PP), polyethylene (PE), polyamide (PA), polybutylene terephthalate (PBT), polyethylene terephthalate (PET), polyphenylene oxide, polyacetal, polymethacrylate, polyoxymethylene, polyvinyl acetal, polystyrene, acryl butadien styrene (ABS), acrylonitrile styrene acrylate (ASA), polycarbonate, polyethersulfone, polysulfonate, polytetrafluoroethylene, polyurea, formaldehyde resins, melamine resins, polyetherketone, polyvinyl chloride, polylactide, polysiloxane, phenol resins, epoxide resins, poly(imide), bismaleimide-triazine, and thermoplastic polyurethane, and copolymers and/or mixtures of the polymers mentioned above.

5. The method according to claim 1, wherein the absorber has an average particle size (d50 value) between 0.01 μm and 50 μm.

6. The method according to claim 1, wherein the absorber is crystal water-free iron(II) orthophosphate of the general formula $Fe_3(PO_4)_2$ and has graftonite crystal structure.

7. The method according to claim 1,
    wherein the carrier material containing the absorber is manufactured into products that comprise the carrier material, the products being selected from the group consisting of:
    packaging material for commercial products, whereby the carrier material is a thermoplastic or duroplastic polymer;
    window panes, whereby the carrier material is a transparent thermoplastic polymer, transparent duroplastic polymer or glass;
    preforms which are provided and designed for further processing into end products; and
    end products made of thermoplastic polymers which are manufactured in a thermal reshaping procedure.

8. The method according to claim 1, wherein the carrier material is a thermoplastic or duroplastic material, hot-melt adhesive, dye, varnish, or silicone,
    wherein the absorber acts as a heating accelerator, polymerization accelerator, or cross-linking accelerator within the carrier material when irradiated with electromagnetic radiation.

9. The method according to claim 1, wherein the step of absorbing electromagnetic radiation involves laser marking, laser inscription, laser welding and/or polymer joining.

10. The method according to claim 1, wherein the step of absorbing electromagnetic radiation involves infrared radiation in the manufacture of electrically conductive metal structures.

11. The method according to claim 1, wherein maximum absorption of the absorber at a wavelength is in the region of 200 nm to 12,000 nm with the absorbed radiation comprising laser radiation and/or non-laser radiation.

* * * * *